United States Patent [19]
Okazaki

[11] Patent Number: 5,783,899
[45] Date of Patent: Jul. 21, 1998

[54] ULTRASONIC VIBRATION MOTOR AND METHOD FOR PERFORMING COARSE AND FINE MOVEMENTS

[75] Inventor: Mitsuhiro Okazaki, Kawasaki, Japan

[73] Assignee: Nikon Corporation, Tokyo, Japan

[21] Appl. No.: 870,268

[22] Filed: Jun. 6, 1997

Related U.S. Application Data

[63] Continuation of Ser. No. 665,080, Jun. 14, 1996, abandoned, which is a continuation of Ser. No. 415,216, Apr. 3, 1995, abandoned.

[30] Foreign Application Priority Data

Apr. 1, 1994 [JP] Japan ............... 6-065252

[51] Int. Cl.$^6$ ................ H02N 2/00; H01L 41/08
[52] U.S. Cl. ........................ 310/317; 310/323
[58] Field of Search ................ 310/316, 317, 310/323, 328

[56] References Cited

U.S. PATENT DOCUMENTS

| | | | |
|---|---|---|---|
| 4,857,791 | 8/1989 | Uchino et al. | 310/321 |
| 4,882,500 | 11/1989 | Iijima | 310/323 |
| 4,954,741 | 9/1990 | Furutsu et al. | 310/316 |
| 5,397,955 | 3/1995 | Takagi et al. | 310/322 |
| 5,410,206 | 4/1995 | Luecke et al. | 310/328 |
| 5,416,375 | 5/1995 | Funakubo et al. | 310/323 |
| 5,418,418 | 5/1995 | T. Hirano et al. | 310/328 |
| 5,672,930 | 9/1997 | Narisawa et al. | 310/323 |
| 5,698,930 | 12/1997 | Takagi | 310/323 |

FOREIGN PATENT DOCUMENTS

| | | | |
|---|---|---|---|
| 0277477 | 11/1988 | Japan | 310/323 |
| 0126178 | 5/1989 | Japan | 310/323 |
| 4069070 | 3/1992 | Japan | 310/317 |
| 4165971 | 6/1992 | Japan | 310/317 |
| 6-269183 | 9/1994 | Japan | 310/317 |

OTHER PUBLICATIONS

Piezoelectric Linear Motors and Application to Driving a Light Pick–Up Element. Y. Tomikawa, M. Aoyagi, T. Ogasawara, A. Yabukl, Tohoku Institute of Technology, Sandai, Jun. 9–11, 1993, all pages.

Ultrasonic Motors Theory and Applications, S. Ueha, Y. Tomikawa, Clarendon Press, Oxford, 1993, all pages.

*Primary Examiner*—Thomas M. Dougherty

[57] ABSTRACT

An ultrasonic motor having a linear elastic body which contacts a relative movement member, piezo-electric elements which are joined to the elastic body, and a first waveform generator which repeatedly generates drive signals that have a first waveform part in which the drive voltage changes slowly on the piezo-electric elements and a second waveform part in which the drive voltage changes rapidly. The ultrasonic motor further has a second waveform generator which produces elliptical movement that is generated by the combined vibrations of longitudinal vibration and flex vibration on the elastic body based on applying sine waves having differing phases to specific locations of the piezo-electric elements and a controller which selectively switches the outputs of the first and second waveform generators.

19 Claims, 10 Drawing Sheets

ULTRASONIC VIBRATION MOTOR AND METHOD FOR PERFORMING COARSE AND FINE MOVEMENTS

This application is a continuation of application Ser. No. 08/665,080, filed Jun. 14, 1996, now abandoned, which is a continuation of application Ser. No. 08/415,216, filed Apr. 3, 1995, now abandoned.

BACKGROUND OF THE INVENTION

1. Field of the Invention

The present invention relates to an ultrasonic vibration motor and method that creates a drive force by producing elliptical movement in a rod-shaped elastic body, and, more particularly, to an ultrasonic vibration motor which has a two-phase drive of a longitudinal vibration mode and a bending vibration mode.

2. Description of the Related Art

FIG. 1 is a diagram showing a conventional linear type ultrasonic vibration motor. With the conventional linear type ultrasonic wave motor, excitation transformer 102 is arranged at one edge of rod-shaped elastic body 101, and damping transformer 103 is positioned at the other side. Vibrators 102a and 103a are joined to transformers 102 and 103, respectively. By applying an alternating current from oscillator 102b to vibrator 102a, rod-shaped elastic body 101 is made to oscillate, and this oscillation is a progressive wave propagated on rod-shaped elastic body 101. Moving body 104, which is pressure joined to rod-shaped elastic body 101, is driven by this progressive wave.

Meanwhile, the vibration of rod-shaped elastic body 101 is transmitted to vibrator 103a through damping transformer 103, and the vibration energy is converted to electrical energy by the vibrator 103a. Load 103b, connected to the vibrator 103a, absorbs the vibrations based on the fact that electrical energy is consumed. The damping transformer 103 prevents the production of standing waves of a mode inherent to rod-shaped elastic body 101 by suppressing the reflection of the end surface of rod-shaped elastic body 101.

The linear type ultrasonic vibration motor of FIG. 1 has problems such as only having a movable range of moving body 104, rod-shaped elastic body 101 must be long, the entire body of rod-shaped elastic body 101 must be made to vibrate; and the device must be made large scale. In addition, to prevent the generation of standing waves of a particular mode, damping transformer 103, for example, is necessary.

To resolve this kind of problem, a variety of self-advancing type ultrasonic vibration motors have been proposed. For example, there is a "asymmetric degeneracy longitudinal L1-flex B4 mode-flat plate motor" which is listed in "222 Piezoelectric Linear Motors for the Purpose of Optical Pickup Movement" of the "Proceedings of the Fifth Electromagnetic Force Dynamics Symposium".

FIG. 2(A) is a front view diagram, FIG. 2(B) is a side view diagram and FIG. 2(C) is a top view diagram of a conventional asymmetric degeneracy longitudinal L1-flex B4 mode-flat plate motor.

Elastic body 1 comprises a rectangular wave flat plate shaped base part 1a, and protruding parts 1b and 1c are formed on one surface of this base part 1a. Piezoelectric elements 2 and 3 are fixed to the other side of the base part 1a of elastic body 1, and they are elements that generate a longitudinal vibration L1 mode and a bending vibration B4 mode.

Protruding parts 1b and 1c of elastic body 1 are provided on the antinode position of the bending vibration B4 movement which is generated on base part 1a, and are pushed by such relative movement members as guide rails (not shown in the diagram).

However, the motor described above in FIGS. 2(A) through 2(C) has a relative movement member and a position determination precision on the order of microns, and there is the problem that the precision of positional determination is insufficient. To resolve this problem, it is possible to jointly use a precision position determination drive system, but if a position determination precision of a different order is sought, normally, a completely different structure is provided. However, this increases the scale of the entire device, and the cost increases. In particular, this type of self-advancing type ultrasonic vibration motor is associated with lowered efficiency accompanied by an increase in weight.

SUMMARY OF THE INVENTION

Accordingly, it is an object of the present invention to provide a linear motor that resolves the previously described problems and can precisely determine its own position by causing micro movement.

It is another object of the present invention to provide a linear motor that can execute both coarse movement and fine movement using one motor.

Additional objects and advantages of the invention will be set forth in the description which follows and, in part, will be obvious from the description, or may be learned by practice of the invention.

Objects of the present invention are achieved by providing a linear motor having an elastic body which contacts a relative movement member, electro-mechanical conversion elements that are connected to the elastic body, and a first drive signal generation unit which repeatedly generates drive signals having a first waveform part in which a drive voltage changes slowly on the electro-mechanical conversion element and a second waveform part in which the drive voltage changes rapidly.

Because the first drive signal generation unit repeatedly generates a first waveform part in which the drive voltage changes slowly on the electro-mechanical conversion element and a second waveform part in which the drive voltage changes rapidly, when the first waveform part is applied to the electro-mechanical conversion element, the elastic body and the relative movement member perform movement together. When the second waveform part is applied, the elastic body conducts relative movement in relation to the relative movement member. The drive signals are determined by oscillations, cycles, or gradient, etc., of the first waveform part and the second waveform part. Because the elastic body does not use harmonics in movement which utilize the drive signals, the amount of deformation of the elastic body is small, a drive with a fine pitch (micro movement) can be made, and precision position determination is possible. Moreover, the amount of drive can be varied by varying the amplitude, generation frequency, or waveform, etc., of the drive signals.

According to another aspect of the invention, the linear motor comprises an elastic body which contacts a relative movement member, electro-mechanical conversion elements which are connected to the elastic body, a first drive signal generation unit which generates first voltage signals having a specific waveform and which are applied to the electro-mechanical conversion elements, a second drive signal generation unit which generates second voltage signals having a different waveform from the first voltage signals and which are applied to the electro-mechanical conversion elements, and a drive signal switch which selectively enables transmission of the first voltage signals and the second voltage signals to the electro-mechanical conversion elements.

The linear motor has a drive system with a rapid drive velocity and coarse pitch, and a drive system with a slow drive velocity and a fine drive pitch which can be realized with a single motor. As a result, coarse movement and fine movement can be executed with a single motor. For this reason, it is possible to drive to a targeted position at a rapid velocity with high precision using a linear motor with a simple structure.

The first drive signal generation unit may also generate a third waveform part in which a constant voltage is provided between the first waveform part and the second waveform part. The third waveform part decreases the effects of inertia in the relative movement member when the linear ultrasonic vibration motor is repeatedly operating.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
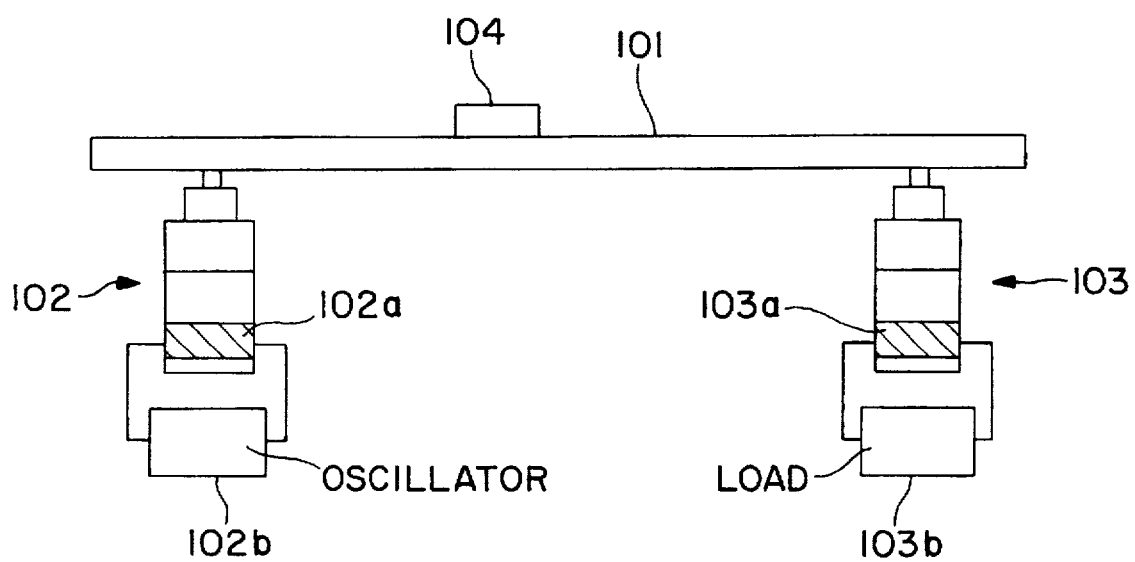
FIG. 1 is a diagram showing a conventional linear type ultrasonic vibration motor.
Figure 2A:
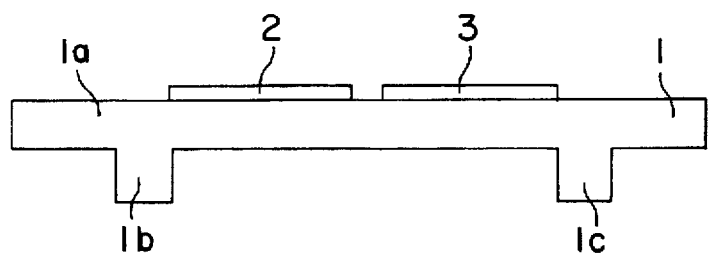
FIG. 2(A) is a front view of a conventional asymmetric degeneracy longitudinal L1-bending B4 mode-flat plate motor.
Figure 2B:
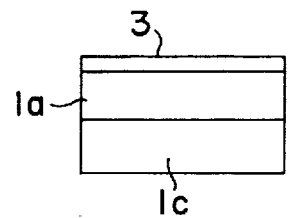
FIG. 2(B) is a side view of the conventional asymmetric degeneracy longitudinal L1-bending B4 mode-flat plate motor shown in FIG. 2(A).
Figure 2C:
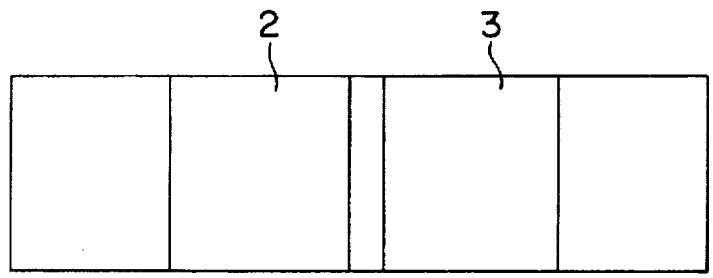
FIG. 2(C) is a top view of the conventional asymmetric degeneracy longitudinal L1-bending B4 mode-flat plate motor shown in FIG. 2(A).

Reference will now be made in detail to the present preferred embodiments of the present invention, examples of which are illustrated in the accompanying drawings, wherein like reference numerals refer to like elements throughout.

Figure 3:
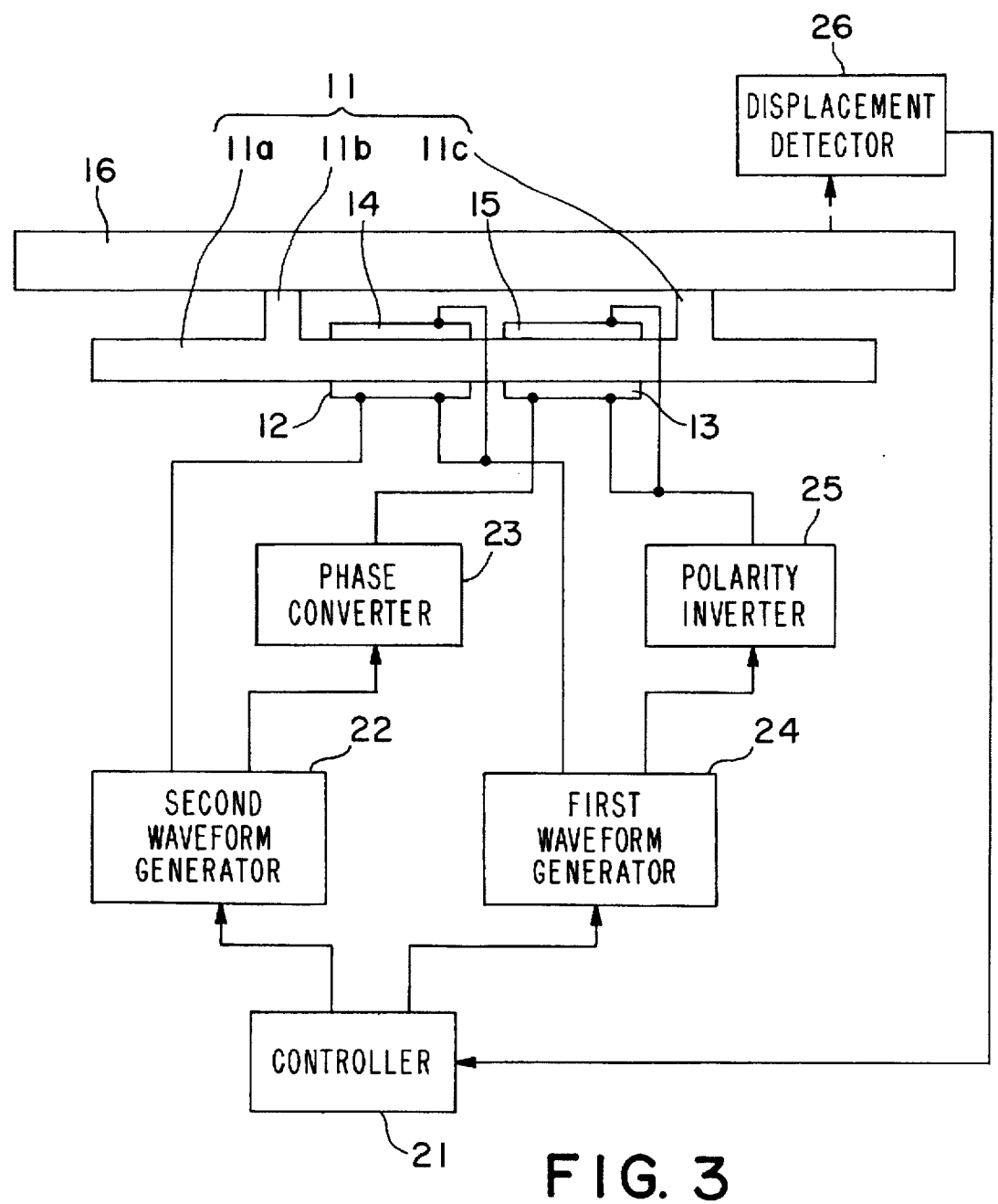
FIG. 3 is a diagram showing a linear motor according to a first embodiment of the present invention.

FIG. 3 is a diagram showing a linear motor according to a first embodiment of the present invention. In this embodiment, elastic body 11 has a base part 11a and two protruding (protuberances) parts 11b and 11c. Two piezoelectric elements 12 and 13 are provided on the base part 11a on the side opposite protruding parts 11b and 11c and two piezo-electric elements 14 and 15 are provided between protruding parts 11b and 11c. As indicated in FIG. 4(C), piezo-electric elements 12–15 are polarized.

Relative movement member 16 is made to have pressure contact on protruding parts 11b and 11c by a pressurizing device not shown in the diagram.

A drive circuit of the linear motor comprises controller 21, second waveform generator 22, phase converter 23, first waveform generator 24, polarity inverter 25, and displacement detector 26.

Controller 21 is for the purpose of switching between coarse movement and fine movement by driving one or the other of second waveform generator 22 and first waveform generator 24 corresponding to the present use conditions. Also, controller 21 can realize high precision in positional determination by controlling the number of cycles of the applied voltage based on the displacement of relative movement member 16 which is detected by displacement detector 26. Controller 21, for example, can do the following kind of control when applied to a situation in which the relative movement member is moved to a given position (targeted value).

FIRST EXAMPLE

In the first example, levels of the amount of discrepancy from the targeted value are divided into several stages (for example, four stages). For example, d1, d2, d3 (d1<d2<d3) are determined as threshold values, and the amount of discrepancy from the targeted value is divided into the four stages of: (a) d3 or greater, (b) greater than d2 and less than d3,(c) greater than d1 and less than d2 and (d) less than d1. Controller 21 executes control in the following manner based on the output of displacement detector 26. In addition, the direction of movement is in the direction of the targeted value.

If (a) is the case, first waveform generator 24 is turned OFF, and second waveform generator 22 is turned ON. If (b) is the case, first waveform generator 24 is turned OFF, and second waveform generator 22 is turned ON. This time, the amplitude of the second waveform is made small, and the drive velocity is reduced. If (c) is the case, first waveform generator 24 is turned ON, and second waveform generator 22 is turned OFF. If (d) is the case, first waveform generator 24 is turned ON, and second waveform generator is turned OFF. At this time, the amplitude of the first waveform is made small, and the drive velocity is reduced. Rapid and reliable drive toward the targeted value can be achieved by driving in the above manner.

SECOND EXAMPLE

In the second example, the drive of an observable test material on the relative movement member is controlled while being observed through a microscope, etc. (transparent electron microscope, scanning electron microscope, scanning tunneling microscope [STM], or atomic force microscope [AFM], etc.). The test material is driven with the second waveform generator 24 being turned ON until reaching the vicinity of the center of the visual field under low magnification (wide visual field), and is driven with the second waveform generator 22 turned OFF and the first waveform generator 24 being turned ON under high magnification (narrow visual field). In this way, the test material can be rapidly and accurately driven to the position desired for observation.

Next, a detailed explanation will be given of the operations of the motor when divided into drive by the second waveform generator 22, and drive by the first waveform generator 24.

FIGS. 4(A) through 5(D) are diagrams for the purpose of explaining the drive operation of the linear motor according to the present embodiment based on the second waveform generator 22.

Figure 4A:
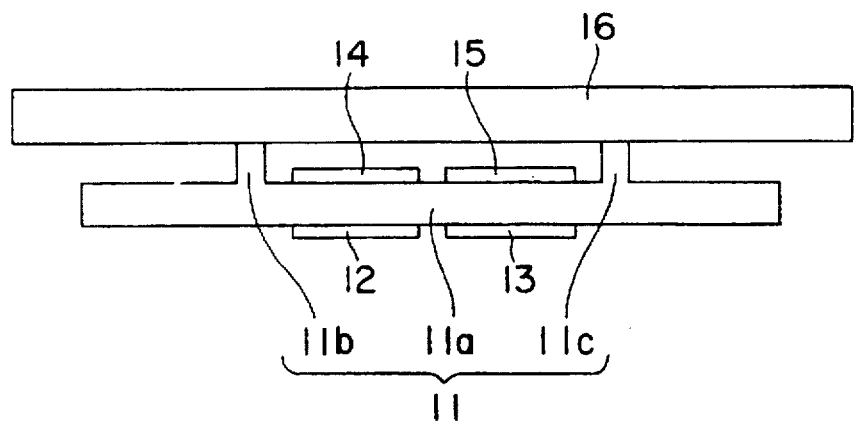
FIG. 4(A) is a diagram of a side view of the linear motor shown in FIG. 3.
Figure 5D:
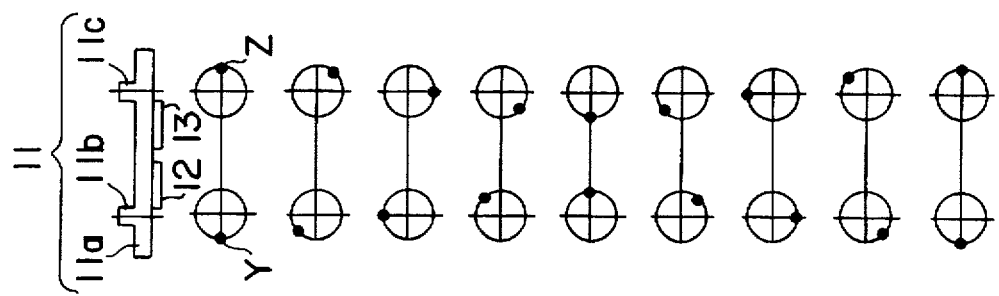
FIG. 5(D) is a diagram showing the temporal changes (t1–t9) of elliptical movement that the linear motor of FIG. 4(A) generates on protuberances 11b and 11c.
Figure 5C:
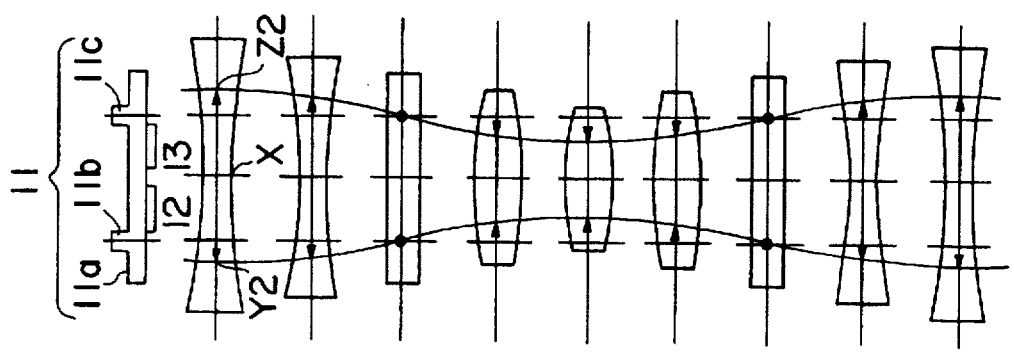
FIG. 5(C) is a diagram showing the conditions of deformation of a cross-section of the linear motor and the temporal changes (t1–t9) of the longitudinal vibrations generated by the same linear motor.
Figure 5B:
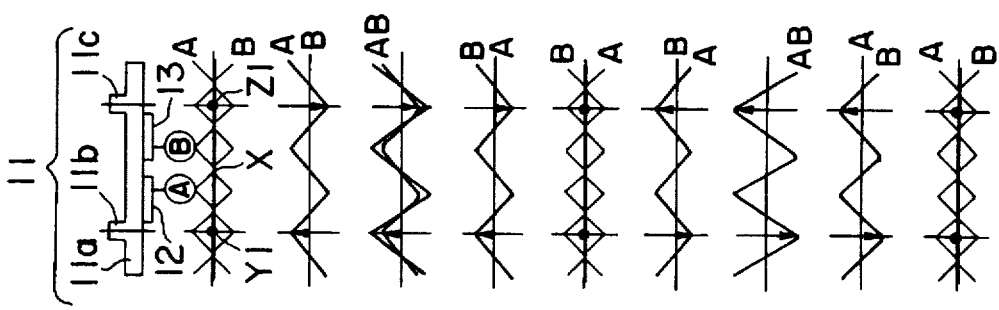
FIG. 5(B) is a diagram showing the conditions of deformation of a cross-section of the linear motor of FIG. 4(A) and indicating the temporal changes of the bending vibrations which are generated by the same linear motor.
Figure 5A:
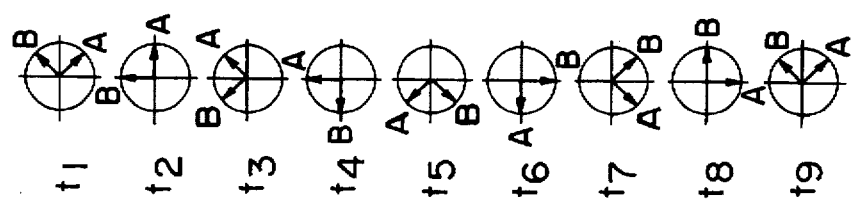
FIG. 5(A) is a diagram showing temporal changes of two-phase input voltages that are input to the linear motor of FIG. 4(A).

Piezo-electric elements 12 and 13, shown in FIG. 4(A), cause longitudinal oscillation L1 mode and flex oscillation B4 mode to be generated on elastic body 11. The shape of elastic body 11 is designed such that the harmonic point based on the oscillation of these respective modes agree and two-phase input voltages A and B are applied as indicated in FIG. 5(A) to be described later. The function of each element is nearly the same as that indicated in FIG. 1 which was previously described.

Figure 4B:
FIG. 4(B) shows the locations of the drive force generated by electrical movements on the ends of protuberances of the linear motor shown in FIG. 4(A).
Figure 4C:
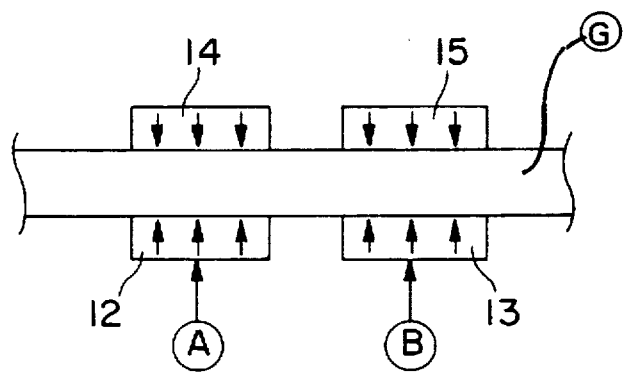
FIG. 4(C) is a diagram showing the polarization of two piezoelectric elements of the linear motor shown in FIG. 4(A).

As indicated in FIGS. 4(A) through 4(C), the linear ultrasonic vibration motor has a configuration in which composite vibrations of bending vibrations and longitudinal vibrations occur by the application of high frequency voltages A and B on the two piezo-electric elements 12 and 13, respectively, and a drive force is produced from this by generating elliptical movement on the ends of protuberances 11b and 11c. Here, G is the ground potential. Moreover, the two piezo-electric elements 12 and 13 are polarized so that they have mutual polarity in the same direction, and high frequency voltage B has a temporal phase difference of $\pi/2$ relative to high frequency voltage A. Phase converter 23 (shown in FIG. 3) generates this phase difference. In addition, the polarization of the two piezo-electric elements 12 and 13 may also be in mutually opposite directions. If the piezoelectric elements 12 and 13 are driven by the second waveform, piezo-electric elements 14 and 15 are not used.

FIG. 5(A) shows the temporal changes of the two-phase high frequency voltages A and B that are input to the linear ultrasonic wave motor at times t1–t9. The horizontal axis of FIG. 5(A) indicates the effective value of the high frequency voltage. FIG. 5(B) indicates the conditions of deformation of a cross section of the ultrasonic vibration motor, and indicates the temporal changes (t1–t9) of the bending vibrations which are generated by the ultrasonic vibration motor. FIG. 5(C) shows the conditions of deformation of a cross section of the ultrasonic wave motor, and indicates the temporal changes (t1–t9) of the longitudinal vibrations generated by the ultrasonic vibration motor. FIG. 5 (D) shows the temporal changes (t1–t9) of the elliptical movement that the ultrasonic vibration motor generates on protuberances 11b and 11c.

Next, the operation caused by the first drive signals of the linear ultrasonic vibration motor of the present embodiment will be explained for each temporal change (t1–t9).

At time t1, as indicated in FIG. 5(A), high frequency voltage A generates a positive voltage, and high frequency voltage B generates an equal positive voltage in the same way. As indicated in FIG. 5(B), the bending movement based on high frequency voltages A and B cancel each other out, and points Y1 and Z1 have zero amplitude. Also, as indicated in FIG. 5(C), the longitudinal oscillation based on high frequency voltages A and B are generated in the elongating direction. As indicted by the arrows, points Y2 and Z2 indicate the maximum elongation when segment X is taken to be the center. Resulting from this, as indicated in FIG. 5(D), both of the above vibrations are combined, with the combination of points Y1 and Y2 making up the movement of point Y, and also, the combination of the movement of points Z1 and Z2 making up the movement of point Z.

At time t2, as indicated in FIG. 5(A), high frequency voltage B is zero, and high frequency voltage A generates a positive voltage. FIG. 5(B) shows that the bending movement generated by high frequency voltage A at point Y1 oscillates in the positive direction, and point Z1 oscillates in the negative direction. Moreover, as shown in FIG. 5(C), longitudinal vibration is generated by high frequency voltage A, and point Y2 and point Z2 move in the direction in which the elastic body is contracting more than at time t1. As a result, as shown in FIG. 5(D), both the bending vibrations and longitudinal vibrations combine, and points Y and Z move by circulating clockwise relative to time t1.

At time t3, as shown in FIG. 5(A), high frequency voltage A generates positive voltage, and at the same time, high frequency voltage B generates an equal negative voltage. As shown in FIG. 5(B), the bending movement caused by high frequency voltages A and B combine and are amplified, point Y1 is amplified in the positive direction more than at time t2, and indicates the maximum positive amplitude value. Point Z1 is amplified in the negative direction more than at time t2, and indicates the maximum negative amplitude value. Moreover, as shown in FIG. 5(C), the longitudinal bending caused by high frequency voltages A and B cancel each other out, and points Y2 and Z2 return to their original positions. As a result, as shown in FIG. 5(D), both of the above vibrations combine, and points Y and Z move by circulating clockwise relative to time t2.

At time t4, as indicated in FIG. 5(A), high frequency voltage A becomes zero, and high frequency voltage B generates a negative voltage. As indicated in FIG. 5(B), bending movement is generated by high frequency voltage B, and the amplitude of point Y1 is lower than at time t3, and the amplitude of point Z1 is lower than at time t3. Moreover, as shown in FIG. 5(C) longitudinal bending is generated by high frequency voltage B, and points Y2 and Z2 contract. As a result of this, as shown in FIG. 5(D), both of the above vibrations combine, and points Y and Z move by circulating clockwise relative to time t3.

At time t5, as shown in FIG. 5(A), high frequency voltage A generates a negative voltage, and at the same time, high frequency voltage B generates an equal negative voltage. As shown in FIG. 5(B), the bending movement based on high frequency voltages A and B cancel each other out, and points Y1 and Z1 become zero amplitude. Moreover, as shown in FIG. 5(C), the longitudinal bending based on high frequency voltages A and B is generated in the contracting direction. As indicated by the arrows, points Y2 and Z2 indicate the maximum contraction when segment X is taken to be the center. As a result of this, as shown in FIG. 5(D), both of the above vibrations combine, and points Y and Z move by circulating clockwise relative to time t4.

Following the changes at times t6-t9, bending movement and longitudinal bending are generated in the same way as the principles described above and, as a result, as indicated in FIG. 5(D), point Y and point Z move by circulating clockwise and undergo elliptical movement.

According to the principles above, this type of ultrasonic vibration motor is configured to generate a drive force by generating elliptical movement at the ends of output take-off members (protuberances) 11b and 11c. Consequently, when pressurizing the ends of protuberances 11b and 11c to relative movement member 16, elastic body 11 moves relative movement member 16 with a rough pitch (coarse movement), but it can be moved at high speed.

FIGS. 6(A) through 7(C) are diagrams for the purpose of explaining the drive operations of the linear motor according to the present embodiment based on the first waveform generator 24. The output of first waveform generator 24 is directly connected to piezo-electric elements 12 and 14 (See FIG. 3), and elastic body 11 is made to expand and contract in the longitudinal direction by connecting a voltage, for which polarity has been inverted via polarity inverter 25, to piezo-electric elements 13 and 15. Consequently, the device operates such that when piezo-electric elements 12 and 14 are contracting, piezo-electric elements 13 and 15 are expanding, and when piezo-electric elements 12 and 14 are expanding, piezo-electric elements 13 and 15 are contracting. The drive signals of the first waveform generator 24 have a first waveform part (t10-t11 of FIG. 6(B)) in which the voltage changes slowly, and a second waveform part (t12-t13 in FIG. 6(A)) in which the voltage changes rapidly.

Figure 6A:
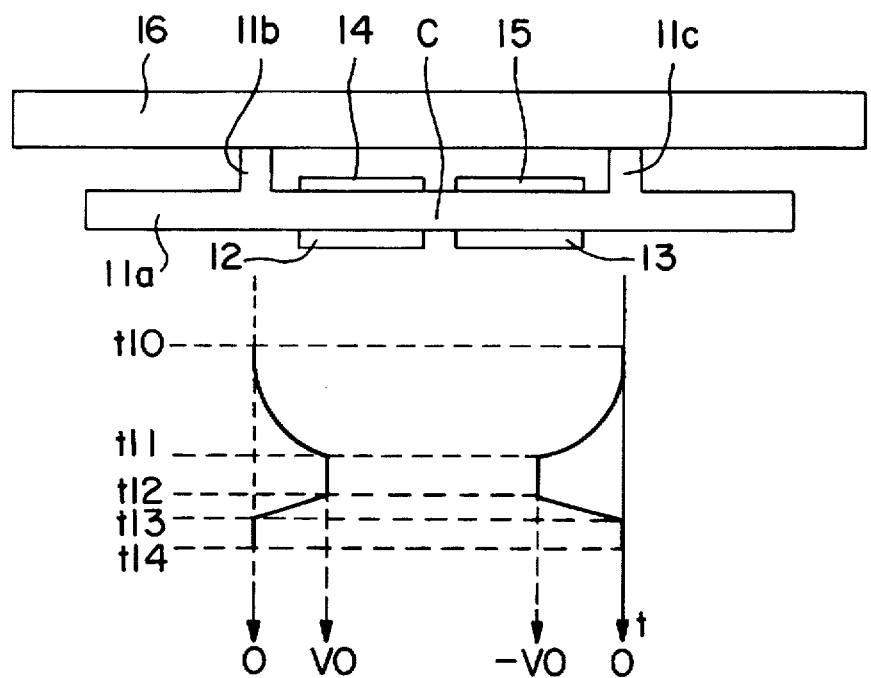
FIGS. 6(A) and 6(B) are waveform diagrams explaining the drive operation of the linear motor according to the first embodiment of the present invention using a first waveform generator.
Figure 6B:
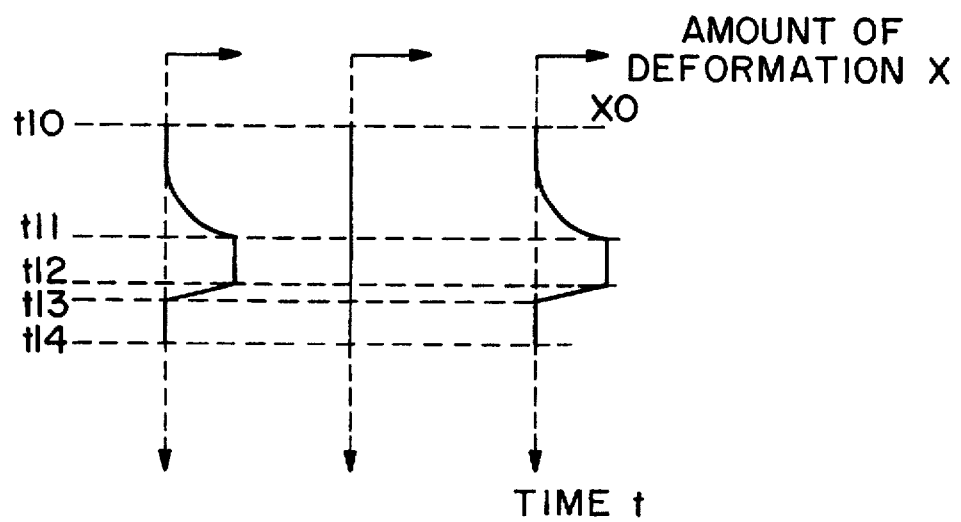

Next, the operation of the linear motor of this embodiment based on the drive signals from the first waveform generator 24 will be explained for each temporal change (t10-t14). As shown in FIG. 6(A), between t10-t11 the voltage waveform that is applied to piezo-electric elements 12 and 14 changes slowly from zero to V0. Also, the voltage which is applied to piezo-electric elements 13 and 15 has reversed polarity via polarity inverter 25, and therefore changes slowly from zero to −V0. Based on these voltages waveforms, piezo-electric elements 12 and 14 are displaced so as to contract, thereby contracting the left side of elastic body 11, and piezo-electric elements 13 and 15 are displaced so as to expand, thereby expanding the right side of elastic body 11 (FIG. 7(B)). At this time, elastic body 11 is secured at central point C, and therefore protruding parts 11b and 11c of the elastic body are both displaced to the right side (FIG. 6(B)).

Moreover, because the voltage waveform changes sufficiently slowly (smoothly) from 0 to V0, the acceleration of protruding parts 11b and 11c is small. For this reason, relative movement member 16 is displaced a distance of only X0 to the right side by the static friction force between protruding parts 11b and 11c and relative movement member 16 (FIG. 4(A)). Consequently, relative movement member 16 moves from the state of FIG. 7(A) to the state of FIG. 7(B).

After this, between t11–t12, specific voltage V0 is maintained (a third waveform part). This retention time is provided for the purpose of making the relative velocity of relative movement member 16 become zero in relation protruding parts 11b and 11c. This retention time need not be provided if there is little effect on the drive force.

For the velocity of protruding parts 11b and 11c (corresponding to the slope of voltage changes) to change rapidly at t12, relative movement member 16 does not stop right away even if protruding parts 11b and 11c stop after t11. This relative movement after t11 is movement in the direction for which drive is being attempted, and therefore the amount of drive can be performed by making the next action (voltage change) wait until this movement has stopped. Because the time until stopping varies depending on the conditions, the optimum length of the third waveform part varies. If there is no effect on the amount of drive, the third waveform part need not be provided.

Figure 7A:
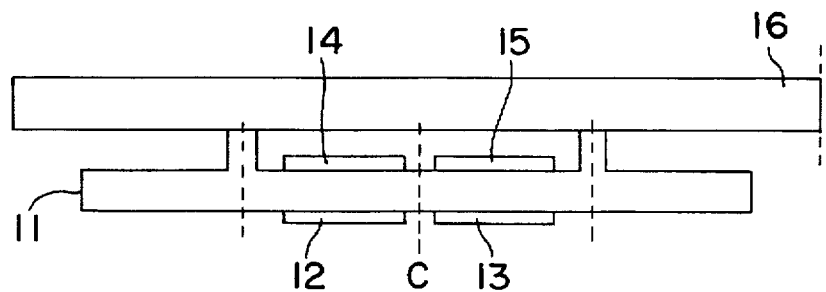
FIGS. 7(A) through 7(C) are diagrams showing the drive operation of the linear motor according to the first embodiment of the present invention using a first waveform generator.
Figure 7B:
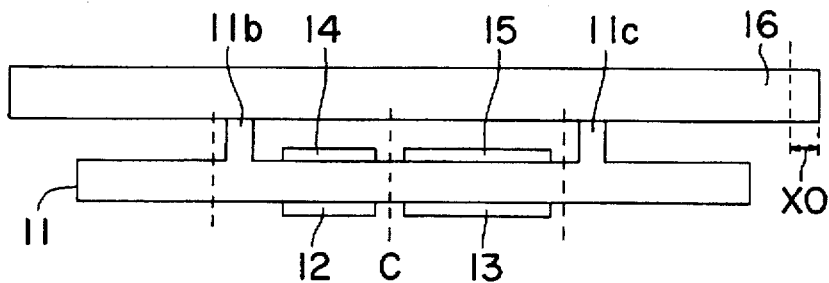
Figure 7C:
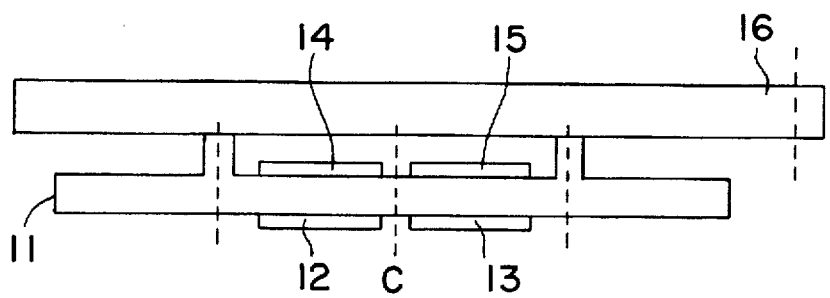

The voltage waveform applied between t12–t13 changes rapidly from V0 to 0, and therefore protruding parts 11b and 11c move by elastic body 11 being rapidly deformed. At this time, because relative movement member 16 attempts to remain in that position because of inertia, slippage between protruding parts 11b and 11c and relative movement member 16 is produced, and the amount of movement of relative movement member 16 becomes sufficiently small in relation to the amount of movement of protruding parts 11b and 11c. Specifically, as indicated in FIG. 7(C), the position of relative movement member 16 remains as is while protruding parts 11b and 11c return to their original positions.

By causing the voltage waveform applied to vary in this way, it is possible to move relative movement member 16. In addition, by reversing the cycles of the applied voltage, it can also be moved in the opposite direction. Moreover, because it is possible to cause the displacement of relative movement member 16 by the operation of one cycle, the desired amount of displacement can be obtained by repeating this. Furthermore, the amount of displacement generated in one cycle is on the order of nanometers, and extremely small micro movements can be executed.

Because the second drive method based on elliptical movement utilizes harmonics, the displacement of protruding parts 11b and 11c are roughly several microns. For this reason, it is not possible to have movement on the nanometer order. When driving by the first drive signals, the amount of displacement is determined by the rigidity of elastic body 11 (determined by the shape and material, etc.) and the generation force of piezo-electric elements 12–15 (determined by the shape and the kind of applied voltage and piezo-electric materials, etc.). For this reason, it is possible to have movement on the nanometer order by selecting a suitable shape such as making elastic body 11 thick, etc.

In this embodiment, as indicated in FIG. 3, highly precise positional determinations can be realized by controlling the waveform such as the number of cycles and amplitude of the applied voltage while measuring the displacement of relative movement member 16 using displacement detector 26.

In the above manner, in the present embodiment, because coarse movement and fine movement can be executed using a signal linear motor by jointly using piezo-electric elements 12–15 provided on elastic body 11, drive of the relative member 16 to the targeted position at high speed with high precision can be accomplished with a simple configuration.

Figure 8A:
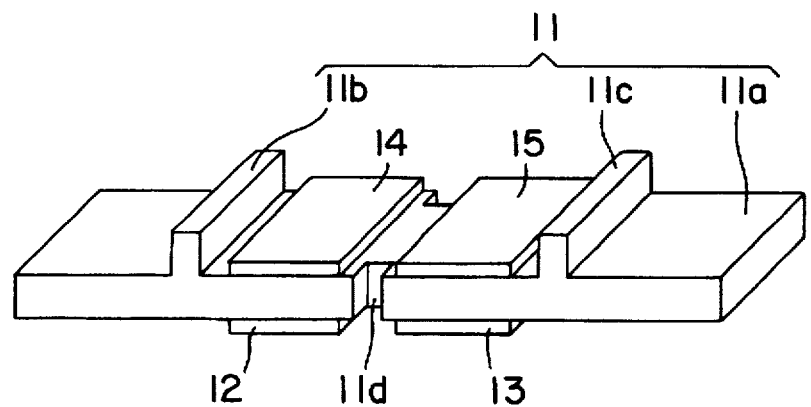
FIGS. 8(A) and 8(B) are perspective views showing details of an elastic body of the linear motor according to the first embodiment of the present invention.
Figure 8B:
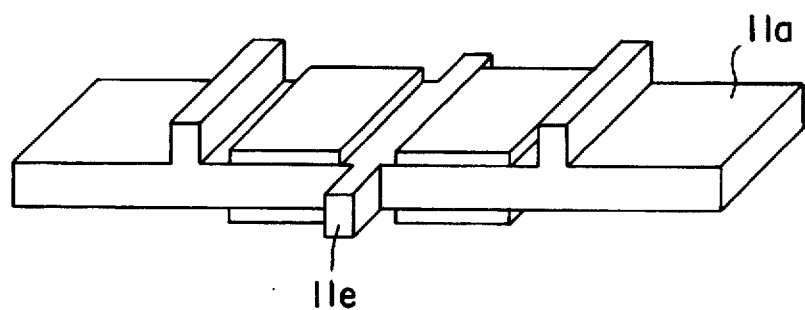

FIGS. 8(A) and 8(B) are perspective views showing the details of the elastic body 11 of the linear motor as shown in FIG. 3. With the linear motor of this embodiment, it is preferable to support the abbreviated central part so that the movement of elastic body 11 is not constrained. To secure it in relation to the direction of movement, this elastic body 11 may be installed on a securing member by providing a notched part 11d on the abbreviated central part of elastic body 11 as shown in FIG. 8(A), or by providing protruding part 11e on the abbreviated central part of elastic body 11 as shown in FIG. 8(B). In addition, instead of notched part 11d, a round hole, etc., may be provided.

Also, in order to move relative movement member 16 by elastic body 11, it is necessary to have pressure contact with the elastic body 11. The weight of relative movement member 16 itself may be sufficient, but if this pressure force is insufficient, pressure may be applied by an energization member such as a spring or an elastic member.

Figure 9:
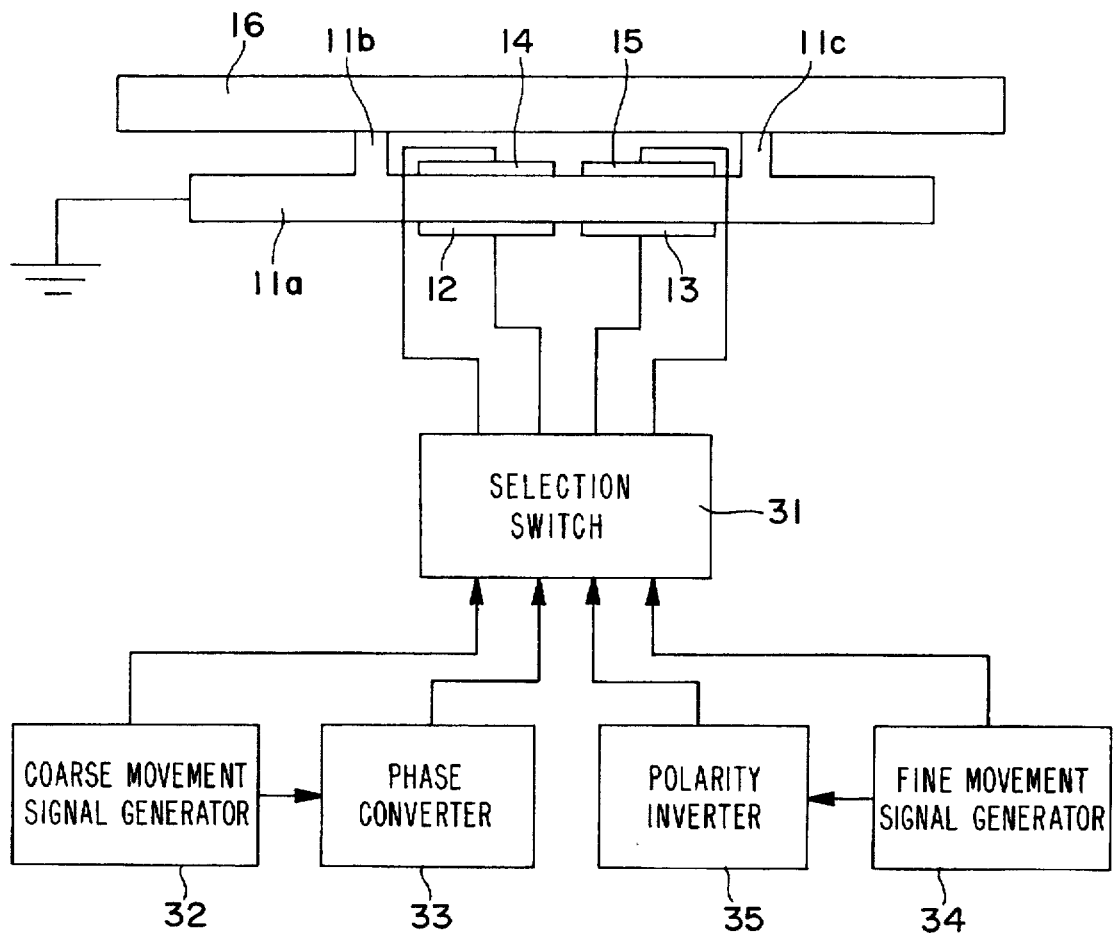
FIG. 9 is a block diagram showing a drive circuit of a linear motor according to a second embodiment of the present invention.
Figure 10:
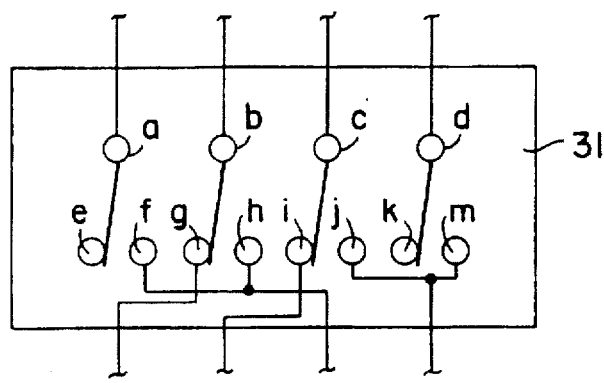
FIG. 10 is a schematic diagram showing a state during coarse movement of a selection switch of the linear motor according to the second embodiment of the present invention.
Figure 11:
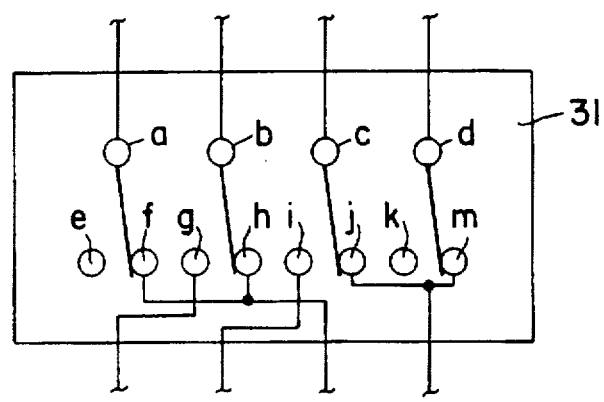
FIG. 11 is a diagram showing a state during fine movement of the selection switch of the linear motor according to the second embodiment of the present invention.

FIG. 9 is a block diagram indicating the drive circuits of a linear motor based on a second embodiment, and FIGS. 10 and 11 are diagrams indicating the selection switch states (during coarse movement, and during fine movement, respectively) of a linear motor according to the second embodiment. The drive circuit comprises a selection switch 31, coarse movement signal generator 32, phase converter 33, fine movement signal generator 34, and polarity inverter 35.

During the execution of coarse movement, selection switch 31 is connected between terminals a-e, b-g, c-i and d-k as shown in FIG. 10, and the output of coarse movement signal generator 32 is transmitted to piezo-electric element 12. Signals in which the output of coarse movement signal generator 32 are shifted in phase π/2 by phase invertor 33 are connected to piezo-electric element 13. Drive is conducted in the same manner as was explained in FIGS. 4(A)–4(C).

During the execution of fine movement, selection switch 31 is connected between terminals a-f, b-h, c-j, and d-m as indicated in FIG. 11, and the output of fine movement signal generator 34 is transmitted to piezo-electric elements 13 and 15. Signals in which the output of fine movement signal generator 34 has been inverted using polarity inverter 35, are connected to piezo-electric elements 12 and 14. Drive is conducted in the same way as explained in FIGS. 5(A)–5 (D).

Figure 12:
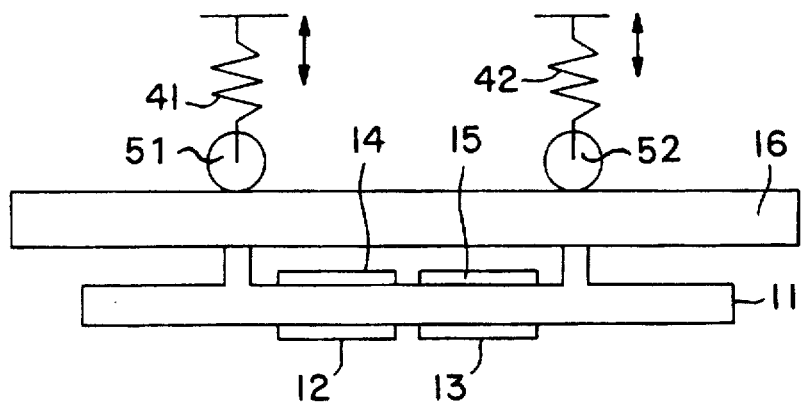
FIG. 12 is a diagram showing a linear motor according to a third embodiment of the present invention.

FIG. 12 is a diagram of a linear motor according to a third embodiment of the present invention. In the first embodiment, pressure is applied to elastic body 11 by the weight of relative movement member 16 itself, but in the linear motor of the third embodiment, relative movement member 16 is pressed onto elastic body 11 by energizing units 41 and 42 which are springs, and stabilized pressure can be applied.

By installing rotational members 51 and 52 such as rollers or sliding members with little friction, the movement of relative movement member 16 will not be obstructed by the energizing units 41 and 42. Also, to select the optimum pressure conditions corresponding to the drive conditions determined by the materials of elastic body 11 and relative movement member 16 or by the drive velocity, the pressurizing force may be varied by changing the positions at which the energizing units 41 and 42 are secured.

Figure 13:
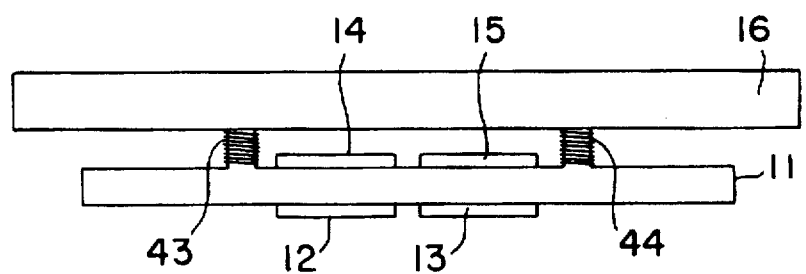
FIG. 13 is a diagram showing a linear motor according to a fourth embodiment of the present invention.

FIG. 13 is a diagram showing a linear motor according to a fourth embodiment of the present invention. When relative movement member 16 is pressed against elastic body 11, it is preferable that the pressurizing conditions are varied depending on whether it is coarse movement or fine movement. Thus, coils are respectively wound around protruding parts 11b and 11c of elastic body 11 to form electromagnets 43 and 44, and by varying the strength of the magnetic field, the pressurizing force may be varied.

In addition, electromagnets may be provided on the lower side of the elastic body 11. Also, the energizing force of energizing units 41 and 42 may be varied even in the third embodiment.

The invention is not limited to the embodiments explained above, and a variety of forms and modifications may be included in the present invention. For example, the linear motor may be made to be self-advancing by changing the position of relative movement member 16 to the bottom surface or a wall surface.

Furthermore, longitudinal L1-bending B4 modes were explained in the examples, but other modes may also be used such as L1-B2, L1-B6, and L2-B4. Also, the linear motor may be independent such that it uses only the drive method based on the drive signals output from the first waveform generator 24 and polarity inverter 25.

The linear motor of the present invention may be doubled and used on a two-dimensional stage that can move in the X-Y directions, for example, for a microscope (optical type, SEM, SPM (scanning probe microscope)). With an SPM, the linear motor can be used to conduct the position determination for the observation position by mounting both the scanning device and the sample material to be observed on the stage, and this has the advantage that it is compact and can be used in a vacuum.

Moreover, the SPM probe may be brought closer to the test material by installing the SPM probe on a drive objective. First, it is brought closer to a given distance by coarse movement, and once the SPM probe has approached to the given distance, it is switched to fine movement, such that the probe may be brought even closer.

What is claimed is:

1. A linear motor for moving a relative movement member, the linear motor comprising:
    an elastic body contacting the relative movement member;
    a plurality of electro-mechanical conversion elements contacting the elastic body; and
    a drive signal generation unit, comprising
        a first drive signal generator to generate first drive signals to be transmitted to said plurality of electro-mechanical conversion elements, the first drive signals having a first waveform part wherein a drive voltage is changed slowly and a second waveform part wherein the drive voltage is changed rapidly, and
        a second drive signal generator to generate second drive signals having a different waveform than the first and second waveform parts, the second drive signals to be transmitted to only some of said plurality of electro-mechanical conversion elements.

2. A linear motor for moving a relative movement member, the linear motor comprising:
    an elastic body contacting the relative movement member;
    a plurality of electro-mechanical conversion elements contacting said elastic body at different locations; and a drive signal generation unit, comprising
- a first drive signal generator to generate first drive signals to be transmitted to said plurality of electro-mechanical conversion elements, the first drive signals having a first waveform part wherein a drive voltage is changed slowly and a second waveform part wherein the drive voltage is changed rapidly, and
- a second drive signal generator to generate second drive signals to be transmitted to said electro-mechanical conversion elements, the second drive signals being sine waves with different phases which are applied to various ones of said plurality of electro-mechanical conversion elements to produce combined longitudinal and bending vibrations on the elastic body.

3. The linear motor as claimed in claim 2, wherein said first drive signal generator generates a third waveform part of constant voltage between the first and second waveform parts.

4. A linear motor for moving a relative movement member, the linear motor comprising:
- a linear elastic body in contact with the relative movement member;
- a plurality of electro-mechanical conversion elements in contact with said linear elastic body at respective different locations to move said linear elastic body;
- a drive signal generation unit, comprising
  - a first signal generator to generate first drive signals to be transmitted to said plurality of electro-mechanical conversion elements, the first drive signals having a first waveform shape to cause said plurality of electro-mechanical conversion elements to move said linear elastic body at first speeds and a second waveform shape to cause said plurality of electro-mechanical conversion elements to move said linear elastic body at second speeds different from said first speeds, and
  - a second signal generator to generate second drive signals to be transmitted to only some of said plurality of electro-mechanical conversion elements and having a waveform shape different from said first and second waveform shapes, to cause said some of said plurality of electro-mechanical conversions to move said linear elastic body at third speeds greater than said first and second speeds; and
- a control unit to alternately enable transmission of said first and second drive signals to corresponding said electro-mechanical conversion elements.

5. The linear motor as claimed in claim 4, further comprising:
- a polarity inverter for inverting a polarity of said first drive signals;
- a phase converter for converting a phase of said second drive signals;
- said linear elastic body having a first surface with first and second protuberances spaced apart from one another and extending beyond said first surface, and a second surface opposite said first surface;
- first and second ones of said plurality of electro-mechanical conversion elements spaced apart from one another and contacting said first surface in between said first and second protuberances;
- third and fourth ones of said plurality of electro-mechanical conversion elements spaced apart from one another and contacting said second surface, opposite said first and second electro-mechanical conversion elements, respectively; and
- said first and third electro-mechanical conversion elements receiving said first drive signals and said second and fourth electro-mechanical elements receiving said first drive signals inverted by said polarity inverter when said control unit enables transmission of said first drive signals, and said first and second electro-mechanical conversion elements receiving said second drive signals and said second drive signals converted by said phase converter when said control unit enables transmission of said second drive signals.

6. The linear motor as claimed in claim 5, further comprising:
- a support member; and
- said linear elastic body having third and fourth surfaces opposite to each other and orthogonal to said first and second surfaces, said linear elastic body having recesses in said third and fourth surfaces, respectively, between said third and fourth electro-mechanical conversion elements and between said first and second electro-mechanical conversion elements;
- wherein said support member fits within said recesses.

7. The linear motor as claimed in claim 5, further comprising:
- a support member; and
- said linear elastic body having third and fourth surfaces opposite to each other and orthogonal to said first and second surfaces, said linear elastic body having protrusions respectively extending from said third and fourth surfaces, between said third and fourth electro-mechanical conversion elements and between said first and second electro-mechanical conversion elements;
- wherein said support member supports said linear elastic body at said protrusions.

8. A linear motor for moving a relative movement member, the linear motor comprising:
- a linear elastic body in contact with the relative movement member, and having a first surface with first and second protuberances spaced apart from one another and extending beyond said first surface, and a second surface opposite said first surface;
- a plurality of electro-mechanical conversion elements in contact with said linear elastic body at respective different locations to move said linear elastic body;
- a drive signal generation unit to generate first drive signals to be transmitted to said plurality of electro-mechanical conversion elements, the first drive signals having a first waveform shape to cause said plurality of electro-mechanical conversion elements to move said linear elastic body at first speeds and a second waveform shape to cause said plurality of electro-mechanical conversion elements to move said linear elastic body at second speeds different from said first speeds;
- a polarity inverter for inverting a polarity of said first drive signals;
- first and second ones of said plurality of electro-mechanical conversion elements spaced apart from one another and contacting said first surface in between said first and second protuberances;
- third and fourth ones of said plurality of electro-mechanical conversion elements spaced apart from one another and contacting said second surface, opposite said first and second electro-mechanical conversion elements, respectively; and said first and third electro-mechanical conversion elements receiving said first drive signals and said second and fourth electro-mechanical elements receiving said first drive signals inverted by said polarity inverter, to vibrate said linear elastic body longitudinally.

9. The linear motor as claimed in claim 8, further comprising:

a support member; and said linear elastic body having third and fourth surfaces opposite to each other and orthogonal to said first and second surfaces, said linear elastic body having recesses in said third and fourth surfaces, respectively, between said third and fourth electro-mechanical conversion elements and between said first and second electro-mechanical conversion elements;

wherein said support member fits within said recesses.

10. The linear motor as claimed in claim 8, further comprising:

a support member; and said linear elastic body having third and fourth surfaces opposite to each other and orthogonal to said first and second surfaces, said linear elastic body having protrusions respectively extending from said third and fourth surfaces, between said third and fourth electro-mechanical conversion elements and between said first and second electro-mechanical conversion elements;

wherein said support member supports said linear elastic body at said protrusions.

11. The linear motor as claimed in claim 8, further comprising:

said linear elastic body contacting the relative movement member at said first and second protuberances; and resilient units pressing the relative movement member against said first and second protuberances.

12. The linear motor as claimed in claim 8, further comprising:

said linear elastic body contacting the relative movement member at said first and second protuberances; and first and second electromagnets, respectively wound around said first and second protuberances, to draw the relative movement member against said first and second protuberances.

13. The linear motor as claimed in claim 8, wherein said relative movement member contacts said second surface of said linear elastic body.

14. A method of controlling motion of an ultrasonic motor having a plurality of electro-mechanical conversion elements contacting a linear elastic body, said method comprising:

generating and supplying first drive signals to a first pair of said plurality of electro-mechanical conversion elements across from each other and on opposite sides of the linear elastic body; and polarity inverting said first drive signals to generate phase inverted drive signals, and supplying the phase inverted drive signals to a second pair of said plurality of electro-mechanical conversion elements across from each other and on opposite sides of the linear elastic body.

15. The method as claimed in claim 14, further comprising:

supplying second drive signals to a first one of said plurality of electro-mechanical conversion elements at a different time than supplying the first and phase inverted drive signals; and phase converting said second drive signals to generate phase shifted drive signals, and supplying said phase shifted drive signals to a second one of said plurality of electro-mechanical conversion elements at the same time as supplying the second drive signals to the first electro-mechanical conversion element, wherein said first and second electro-mechanical conversion elements are on a same side of the linear elastic body as one another.

16. A linear motor for moving a relative movement member, the linear motor comprising:

an elastic body contacting the relative movement member;

a plurality of electro-mechanical conversion elements contacting the elastic body; and a drive signal generation unit, comprising a first drive signal generator to generate first drive signals to be transmitted to said plurality of electro-mechanical conversion elements, the first drive signals having a first waveform part wherein a drive voltage is changed slowly and a second waveform part wherein the drive voltage is changed rapidly, and a second drive signal generator to generate second drive signals having a different waveform than the first and second waveform parts, the second drive signals to be transmitted to only some of said plurality of electro-mechanical conversion elements to produce combined longitudinal and bending vibrations on the elastic body.

17. A linear motor for moving a relative moving member, the linear motor comprising:

an elastic member having a rectangular parallelepiped shape and contacting the relative moving member;

a first driving unit having first and third electro-mechanical converting elements which expand and contract according to transmitted electrical energy and contacting the elastic member; and a second driving unit having second and fourth electro-mechanical converting elements which expand and contract according to transmitted electrical energy and contacting the elastic member;

wherein said first driving unit has the first electro-mechanical converting element disposed on a first face of said elastic member and the third electro-mechanical converting element disposed on a second face opposite to the first face, and the first and third electro-mechanical converting elements are substantially equidistant from a plane perpendicular to a direction of driving of the linear motor; and said second driving unit has the second electro-mechanical converting element disposed on the first face and the fourth electro-mechanical converting element disposed on the second face, and the second and fourth electro-mechanical converting elements are substantially equidistant from the plane perpendicular to the direction of driving of said linear motor;

wherein a driving force of said linear motor is generated by an extension of the electro-mechanical converting elements included in one of the first and second driving units and a contraction of the electro-mechanical converting elements included in the other one of the first and second driving units.

18. The linear motor as claimed in claim 17, further comprising:

a drive circuit to generate drive signals to be transmitted to the first, second, third and fourth electro-mechanical converting elements;

wherein a polarity of a first drive voltage of the drive signals applied to said first and second electro-mechanical converting elements differ from a polarity of a second drive voltage of the drive signals applied to said third and fourth electro-mechanical converting elements.

19. The linear motor as claimed in claim 18, wherein each of said drive signals has a first waveform part wherein the drive voltage is changed slowly and a second waveform part wherein the drive voltage is changed rapidly.

* * * * *